(No Model.)
J. W. DICKINSON.
AERATOR.
No. 514,915.  Patented Feb. 20, 1894.
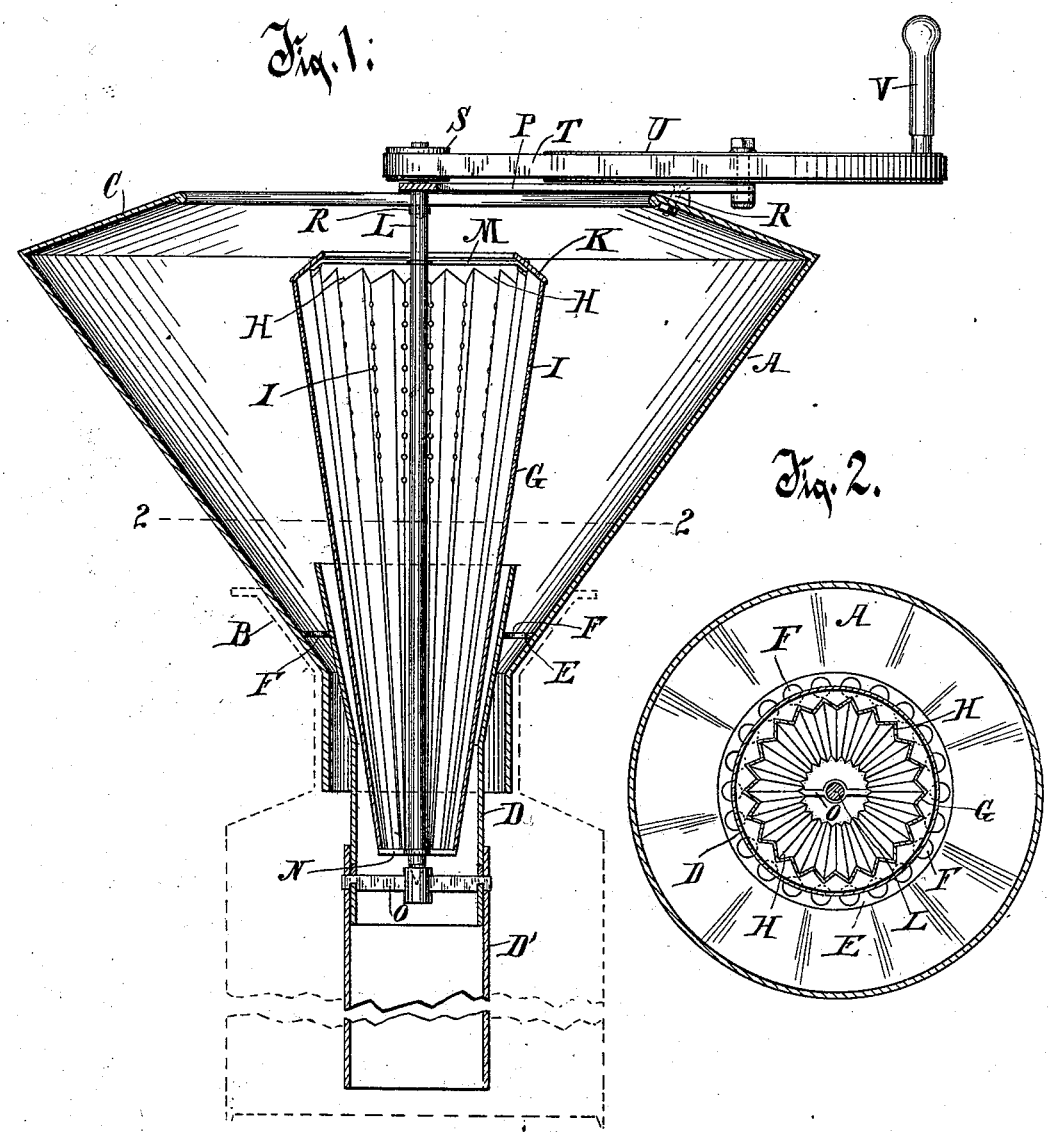
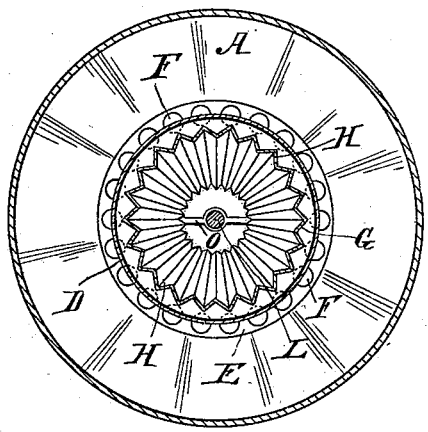
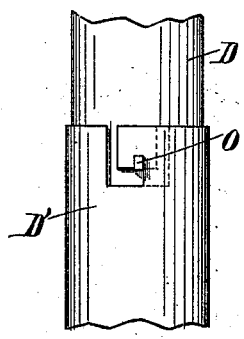
Witnesses.
O. H. Kuntz.
Anna C. Faust.
Inventor.
James W. Dickinson
By Benedict & Morsell
Attorneys.

UNITED STATES PATENT OFFICE.

JAMES W. DICKINSON, OF MILWAUKEE, WISCONSIN, ASSIGNOR OF ONE-HALF TO JOSEPH L. COX, OF SAME PLACE.

AERATOR.

SPECIFICATION forming part of Letters Patent No. 514,915, dated February 20, 1894.

Application filed October 27, 1893. Serial No. 489,311. (No model.)

*To all whom it may concern:*

Be it known that I, JAMES W. DICKINSON, of Milwaukee, in the county of Milwaukee and State of Wisconsin, have invented a new and useful Improvement in Aerators, of which the following is a description, reference being had to the accompanying drawings, which are a part of this specification.

It is well known, that fresh milk contains gases and animal odors that are unpleasant to the sense of smell and taste, and that are detrimental to the milk, in that if not removed therefrom they cause the milk to sour much sooner than it does when those gases and animal odors are removed therefrom while the milk is yet fresh and warm.

The object of my invention is to provide an aerator especially adapted for aerating and cooling milk conveniently and rapidly and thereby completely depriving it of the undesirable gases and animal odors, whereby the milk is made pleasant to the taste and put in a condition to keep sweet for an extended period of time.

My invention consists of the apparatus and its parts hereinafter described and claimed, or their equivalents.

In the drawings, Figure 1, is a vertical central section of the complete device. Fig. 2, is a transvers section looking downwardly, on line 2—2 of Fig. 1. Fig. 3, is a detail.

In the drawings, A is a case advisably made of thin galvanized sheet iron, which case is preferably of funnel form, and so constructed at its lower extremity, as to be adapted to enter and fit in and be supported by a milk can, which cans are usually of the form indicated by the dotted lines at B. The upper extremity of this case A is preferably left open for conveniently cleaning it, except that there is an annular partial cover C extending inwardly a distance from the top edge of the case A, this partial cover being adapted to prevent the overflow of any milk thrown upwardly against the case.
wardly against the case.

Within the case A at and near its lower extremity, and projecting below it, there is an inner case or tubular pump well D, which at its upper extremity is somewhat funnel shaped, merely to render it analogous in form to the inclosed centrifugal pump, hereinafter described. This tubular case D extends below the case and is intended and adapted to reach nearly to the bottom of the milk can B, so that milk drawn and elevated by the inclosed pump from near the top of the case D will be replaced by other milk flowing from the can B near its bottom into the case D. The case D is preferably made with a detachable lower section D', which may be made of such suitable length as will adapt it to reach nearly to the bottom of the can B. For this purpose a number of sections D' may be employed of substantially the same form but of varying lengths, adapted for use in cans of different heights. The case or pump-well D is a little smaller in diameter than the neck of the case A, and is secured in place to the case A by means of an annular plate E secured to the cases A and D. The annular plate E is provided with a series of apertures F through which milk runs downwardly freely from the case A into the can B.

Within the case A and partially within the inner case D, there is a frusto-conical hollow wheel, or centrifugal pump G. This frusto-conical shell or wheel G is creased or corrugated vertically forming a series of troughs H H extending from its lower to its upper extremity. Also the shell G near its upper extremity is provided with a series of apertures or perforations I I in the outer lines of the corrugations or troughs H H. The top of the shell G is partially closed by the annular flange K extending inwardly for a short distance from the top of the shell. This shell G is fixed to the vertically disposed central shaft L, conveniently by cross bars M N fixed to the shell at the top and bottom respectively. The shaft L at its lower extremity is stepped in the transverse bar O fixed in the case D. For convenience of construction the extremities of the bar O project beyond the outer surface of the case D and form lugs adapted to receive thereon and engage the section D' and retain it detachably in place on the case D. At its upper extremity the shaft L is journaled in a T-shaped frame P, which is secured to the annular partial cover C, conveniently by bolts, as shown at R. A small band wheel S is fixed on the shaft L and a driving belt T running on this band wheel, runs also on a larger band wheel U. The band wheel U is journaled on one leg of the frame P and is provided with a wrist handle V for driving it.

The operation of the apparatus is substantially as follows. The case A with the therein supported apparatus being placed in the top of a can B, nearly full of milk so that the milk comes up in the case D about the lower part of the pump G, thereupon the shell or pump G being revolved rapidly by rotating the wheel U, the milk will be rapidly raised in the shell G along the creases or troughs H toward the top of the shell and will escape radially, being driven by centrifugal force, through the apertures I toward and against the case A down which it will run through the apertures F into the can B on the outside of the case D. In this manner not only the entire contents of the can can be quickly raised and sprayed through the apertures I, but in a comparatively short time the entire supply of milk may be repeatedly carried through this process. By this means the milk will be thoroughly aerated, purified and cooled. If desired ice may be packed about the case A in any convenient manner, to aid and intensify the process of cooling. Ordinarily, however, this will not be required or desirable.

In the drawings the creases or corrugations in the shell G are shown in angular form and as being disposed vertically, the corrugations may, however, be rounded, and the creases or troughs may be made more or less spiral if desired though experiments made by me heretofore have convinced me that the vertical disposition of the troughs, is most satisfactory. The slight clearance between the shell G and the case D permits of the free passage of air.

Having thus described my invention, what I claim, and desire to secure by Letters Patent, is—

1. A milk aerator, comprising an outer case, and a vertically disposed frusto-conical or tapering shell having corrugations or troughs in the inner surface extending substantially from the bottom to the top of the shell and provided with apertures through the shell in the troughs near its upper extremity, and means for revolving the shell, substantially as described.

2. The combination with an outer case, and an interior tubular case between which and the outer case there is a passage for milk, of a vertically disposed frusto-conical or tapering shell having corrugations or troughs in its inner surface extending substantially from the bottom to the top of the shell and provided with apertures through the shell in the troughs near its upper extremity, and means for revolving the shell, substantially as described.

3. The combination with an outer case, and an inner tubular case secured to the outer case permanently at a distance therefrom, of a frusto-conical or tapering shell having corrugations or troughs in its inner surface extending substantially from the bottom to the top of the shell, said shell being mounted permanently on a central vertically disposed revoluble shaft having bearings in the cases, the frusto-conical shell being so disposed partly within the inner case, as to provide a space about the shell between it and the surrounding and adjacent inner case, for the passage of air, substantially as described.

4. A milk aerator, comprising an outer funnel-shaped case adapted to be set and thereby supported upright in the mouth of a milk can, said case being provided with an elongated tubular lower extremity or section adapted to extend downwardly into the milk can, a frusto-conical vertically disposed shell mounted revolubly in the outer case, said shell having corrugations or troughs in its inner surface extending substantially from its bottom to its top, adapted as the shell is revolved to carry milk upwardly therein by centrifugal action, and means for rotating the shell whereby milk is carried upwardly in the troughs of the shell and is discharged therefrom into the outer case in and from which it descends by gravity to the can, substantially as described.

In testimony whereof I affix my signature in presence of two witnesses.

JAMES W. DICKINSON.

Witnesses:
  C. T. BENEDICT,
  ARTHUR L. MORSELL.